United States Patent [19]

Gumbert

[11] Patent Number: 5,547,123
[45] Date of Patent: Aug. 20, 1996

[54] METHOD OF SECURING AN APPARATUS PART

[75] Inventor: Hans Gumbert, Sinn, Germany

[73] Assignee: U.S. Philips Corporation, New York, N.Y.

[21] Appl. No.: 293,359

[22] Filed: Aug. 19, 1994

[30] Foreign Application Priority Data

Aug. 21, 1993 [DE] Germany .......................... 43 28 211.3

[51] Int. Cl.$^6$ .............................................. B23K 28/02
[52] U.S. Cl. ................................................ 228/173.6
[58] Field of Search ........................... 228/173.3, 173.6, 228/173.1; 219/121.14, 121.64; 72/359, 335, 385, 391.2

[56] References Cited

U.S. PATENT DOCUMENTS

| 2,406,281 | 8/1946 | Dahl | 228/173.3 |
| 4,072,039 | 2/1978 | Nakanishi | 72/335 |
| 4,713,960 | 12/1987 | Gassaway | 72/359 |
| 5,155,326 | 10/1992 | Whims et al. | 219/121.64 |

*Primary Examiner*—Kenneth J. Ramsey

[57] ABSTRACT

The invention relates to a method of securing an apparatus part in a hole (5) in a metal base plate (1), adjoining peripheral areas (5a, 7a) of the hole (5) and of the part (7) being fused to one another by melting adjoining material portions of the base plate (1) and the part (7) by means of a parallel beam of coherent light (laser light), a mandril (15) being introduced into the hole (5) in which the part (7) is to be secured in a precise orientation relative to the x, y and z axes of the base plate, which mandril (15) is introduced in the exact x, y and z orientation relative to the base plate (1), the edge (5a) of the hole being upset in the mandril direction or z-axis direction at a plurality of peripheral areas of the hole which are equispaced along the 360 angular degrees of the edge (5a) of the hole, as a result of which a protective layer (3) on the base plate (1) is broken up or removed by mechanical deformation in the fusing area prior to fusing, so as to expose the bare metal in the fusing area, the mandril (15) being replaced by the part (7) to be secured, upon which the light which serves for fusing impinges directly on the exposed metal, melts this metal and fuses with the equally molten surface area (7a) of the part (7) between the supports (21) formed by upsetting at the peripheral areas of the hole and the part (7).

2 Claims, 2 Drawing Sheets

METHOD OF SECURING AN APPARATUS PART

BACKGROUND OF THE INVENTION

The invention relates to a method of securing an apparatus part in a hole in a metal base plate, adjoining peripheral areas of the hole and of the part being fused to one another by melting adjoining material portions of the base plate and the part by means of a parallel beam of coherent light (laser light).

It is known to weld metal pans, such as a shaft, to a metal plate by means of a laser-welding technique. A special quality requirement to be met may be that the part is to be welded properly to the base plate in an accurately defined orientation in the x, y and z directions. In the case that the z direction extends perpendicularly to the plane of the base plate it has been attempted to achieve a precise orientation by drawing a socket into the base plate. The part to be secured is then inserted into the socket opening and the rim of the socket and the part are welded to one another by means of the laser-welding technique.

This welding technique is found to be unsatisfactory and faulty. In many cases the welding results are so poor that re-welding is necessary.

From DE 27 50 352 A1 it is known to provide the areas of a coated part which are to be welded with a bevel in order to remove coating layers. Such bevels represent additional operations which have no influence on the geometrical orientation of the shaft.

SUMMARY OF THE INVENTION

It is an object of the invention to provide a method of securing an apparatus part in or to a metal base plate in such a manner that a reliable and precisely oriented weld is possible in one pass.

According to the invention this object is achieved in that a mandril is introduced into the hole in which the part is to be secured in a precise orientation relative to the x, y and z axes of the base plate, which mandril is introduced in the exact x, Y and z orientation relative to the base plate, in that the edge of the hole is upset in the mandril direction or z-axis direction at a plurality of peripheral areas of the hole which are equispaced along the 360 angular degrees of the edge of the hole, as a result of which a protective layer on the base plate is broken up or removed by mechanical deformation in the fusing area prior to fusing, so as to expose the bare metal in the fusing area, in that the mandril is replaced by the part to be secured, and in that the light which serves for fusing then impinges directly on the exposed metal, melts this metal and fuses with the equally molten surface area of the pan between the supports formed by upsetting at the peripheral areas of the hole and the pan.

The melting and fusing problems are eliminated by breaking up the protective layer and thereby exposing the metal of the base plate.

With its shape and orientation the mandril ensures the exact formation and position of the supports on the die. If the mandril is subsequently replaced by the shaft the laser beam can reliably weld the shaft to the pure plate material, which is exposed when bent up.

Dividing a socket into a plurality of separate supports which are deformed separately guarantees a precise orientation of the shaft between the individual supports.

A device for carrying the method is characterised by dies which are applicable to the base plate from both sides in such a manner that they cover the peripheral area of the hole while leaving the hole free, and a mandril which is introducible in a deformation direction from the first die into the second die through the hole in the base plate with a proper fit, the mandril having radially projecting shoulders which are spaced from the mandril head, which shoulders are engageable in guides of the first die and during introduction of the mandril only move into the area of the base plate, the second die having chambers in line with the direction of introduction of the shoulders, into which chambers the sheet material which is displaceable by the shoulders can be pressed to form the supports. The mandril and the bending portions are consequently integrated and are thus jointly moved.

A further advantage of the formation of supports inside the second die is that friction on the walls of the recesses leads to additional abrasion of material from the protective layer, so that the base-plate metal is exposed to a greater extent at the location of the supports.

BRIEF DESCRIPTION OF THE DRAWINGS

The invention will now be described in more detail with reference to the drawings. In the drawings.

DETAILED DESCRIPTION OF THE PREFERRED

Figure 1:
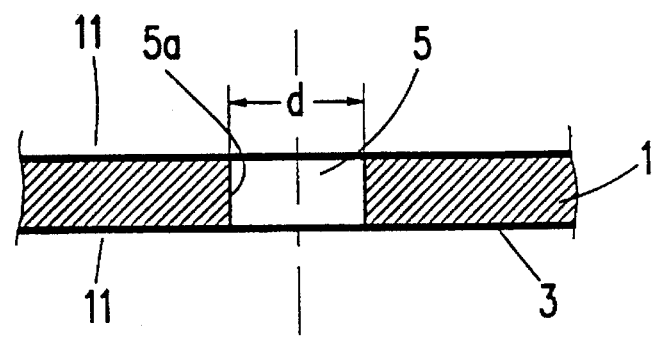
FIG. 1 is a sectional view showing a pan of a metal base plate with a hole in which a shaft is to be mounted.

FIG. 1 shows a part of a base plate 1 made of steel sheet and having a protective layer 3, for example of zinc, on its surface. The base plate 1 has a hole 5 of a diameter d. The hole 5 serves for mounting an apparatus part, i.e. a shaft 7 or alternatively a bearing bush, shown in FIGS. 5 and 6, which shaft 7 should have an accurately defined orientation in the x, y and z directions. The shaft 7 is to be secured to the base plate 1 by a laser-welding technique.

In order to ensure a correct laser-welding the hole 5, i.e. its edge 5a, is prepared.

Figure 2:
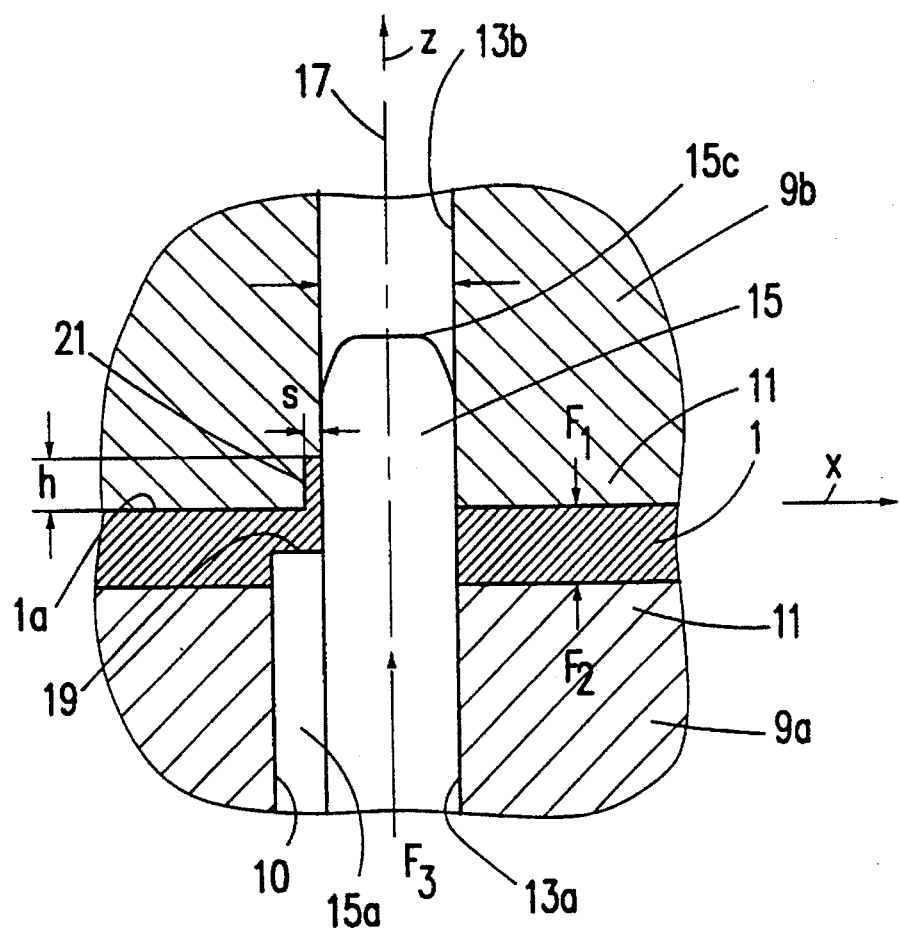
FIG. 2 is a sectional view showing the base plate interposed between dies which surround the hole in the base plate, and a mandril which has entered the hole in the base plate and the corresponding holes in the dies.

As is shown in FIG. 2, a first die 9a and a second die 9b are disposed at opposite sides of the base plate 1. The dies 9a and 9b are pressed from both sides against the peripheral area 11 of the hole 5 with forces $F_1$ and $F_2$.

Figure 6:
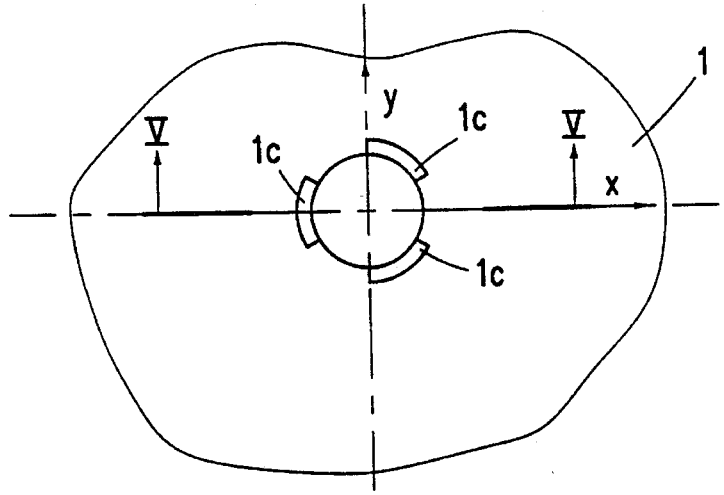
FIG. 6 is a plan view corresponding to the sectional view in FIG. 5.

The dies 9a and 9b have apertures 13a, 13b which are in register with the hole 5 and whose diameter corresponds to the diameter d of the hole 5. A mandril 15 can be introduced into the apertures 13a, 13b and, consequently, into the hole 5, and has a wall whose shape corresponds to the shape of the hole 5 and the apertures 13a and 13b. The direction of insertion 17 of the mandril 15, which is aligned and coincides with the central axis of the hole 5 and the apertures 13a and 13b, is oriented from the die 9a to the die 9b through the base plate 1. $F_3$ is the force with which the mandril 15 is introduced into the aperture 13a. The direction of insertion 17 is oriented exactly in the z direction, which extends perpendicularly to the x-y plane of the base plate 1 (FIG. 6).

The die 9a has locating grooves 10, which extend radially outward and which are engageable by radial ribs 15a of the mandril 15. The ribs 15a terminate in shoulders 19. The shoulders are spaced from the mandril head 15c. Such ribs 15a are spaced at 120° about the mandril circumference of 360° and are engageable in corresponding locating grooves 10.

The die 9b has chambers 21 in line with the ribs 15a. The chambers have a radial depth s relative to the edge 5a of the hole and a height h relative to the surface 1a of the base plate.

If the mandril 15 is now introduced into the die 9a with a force $F_3$ and is pressed further into the base plate 1 down to substantially half its thickness the displaced material at the location of the periphery of the hole in the base plate 1 flows into the chambers 21.

Figure 3:
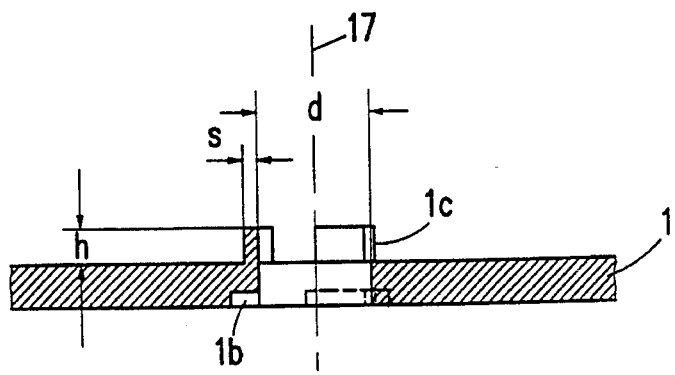
FIG. 3 is a sectional view the base plate which has been deformed around the hole in the base plate.
Figure 4:
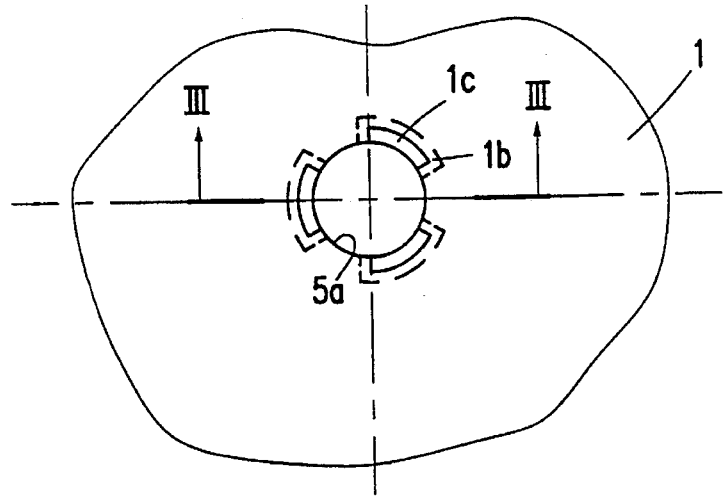
FIG. 4 is a plan view corresponding to the sectional view in FIG. 3.

FIG. 3 shows that, as a result of this, recesses 1b are formed in the base plate 1 by the shoulders 19 and the chambers 21 now accommodate supports 1c, which are equidistantly spaced from the central axis 17.

Figure 5:
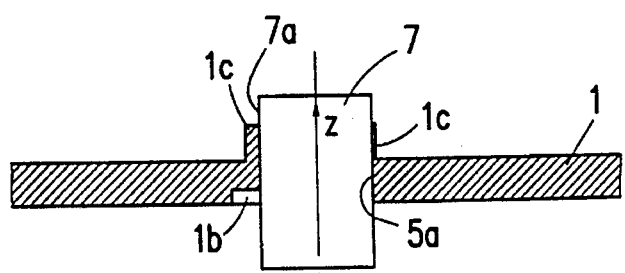
FIG. 5 is a sectional view of a shaft or bearing bush mounted in the base plate.

The advantage of the supports 1c thus formed by deformation of the material of the metal plate is that the deformation process causes a protective layer 3 to break up, thereby exposing the bare metal. The orientation of the supports 1c corresponds exactly to the orientation defined by the mandril 15. If now, as is shown in FIG. 5, the shaft 7 is inserted into the hole 5 with the edge 5a, there will be metal-to-metal contact between the surface of the shaft 7 and the supports 1c. By means of a laser-welding technique portions of the supports 1c and the wall 7a of the shaft 7 can be melted and fused to one another.

A further advantage is the exact 90° position of the mounting hole relative to the surface and the formation of mounting lugs of a thickness corresponding to that of the other part (shaft or bearing bush). This results in improved welding conditions.

I claim:

1. A method for securing a part of an apparatus into a hole in a metal base plate having an overlying protective layer, said method comprising the steps of:
   (a) introducing a mandril into the hole of the base plate in a precise orientation along a z-axis perpendicular to the metal base plate;
   (b) mechanically deforming a plurality of portions of the edge of the hole to remove the protective layer at the edge in the direction of introduction of the mandril to form a plurality of peripheral areas equi-spaced about the circumference of the hole with exposed bare metal portions;
   (c) replacing the mandril by the part to be secured to the base plate;
   (d) melting the bare metal portions of the base plate and of corresponding portions of the part to be secured by coherent laser light; and
   (e) fusing together the melted bare metal portions and the melted corresponding portions of the part to be secured to form a secure connection between the base plate and the part.

2. A device for securing a part of an apparatus into a hole in a metal base plate having an overlying protective layer, said device comprising
   (a) dies provided at opposite sides of the metal base plate, said dies covering only peripheral areas at edges of the hole;
   (b) a mandrel introduced through a first of said dies through the hole with a snug fit to a second of said dies;
   (c) radially projecting shoulders of said mandrel spaced from the end of said mandrel which is introduced into said second of said dies, said shoulders being engaged into grooves of said first of said dies to move areas of said metal base plate at said edges of said hole into chambers of said second die aligned with said shoulders for receiving sheet material of said metal base plate, thereby removing the protective layer at said edges; and
   (d) supports provided by said sheet material of said metal base plate being moved into said chambers.

* * * * *